(12) United States Patent
Watanabe et al.

(10) Patent No.: US 6,324,187 B1
(45) Date of Patent: Nov. 27, 2001

(54) COMMUNICATION APPARATUS

(75) Inventors: Keiji Watanabe, Yamatokoriyama; Makoto Nakabayashi, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/115,388

(22) Filed: Jul. 14, 1998

(30) Foreign Application Priority Data

Jul. 15, 1997 (JP) .................................................... 9-190141

(51) Int. Cl.[7] .................................................. H04N 1/333
(52) U.S. Cl. ......................... 370/522; 358/434; 358/468
(58) Field of Search ........................... 370/522; 358/434, 358/468; 379/93.08, 100.17

(56) References Cited

U.S. PATENT DOCUMENTS

| | | | |
|---|---|---|---|
| 5,751,441 | * 5/1998 | Morimoto | 358/435 |
| 6,021,183 | * 2/2000 | Yoshida | 379/93.08 |
| 6,236,469 | * 5/2001 | Watanabe et al. | 358/468 |

FOREIGN PATENT DOCUMENTS

| | | |
|---|---|---|
| 0 724 355 A2 | 7/1996 | (EP). |
| 7-298027 | 11/1995 | (JP). |
| A 8-214136 | 8/1996 | (JP). |
| 8-298582 | 11/1996 | (JP). |
| A 8-298579 | 11/1996 | (JP). |

* cited by examiner

*Primary Examiner*—Melvin Marcelo
(74) *Attorney, Agent, or Firm*—David G. Conlin; Dike, Bronstein, Roberts & Cushman/Edwards & Angell

(57) ABSTRACT

An object of the invention is to provide a communication apparatus capable of communicating by transmitting and receiving a protocol signal in accordance with a predetermined protocol, when receiving a DIS without receiving an ANSam signal, or not receiving a CM signal within a predetermined period after transmission of the ANSam signal. With a line connection established, when a calling station receives a DIS without receiving the ANSam signal, the calling station sends a DCS signal or an NSS and then executes the protocol according to Recommendation T.30. Further, with a line connection established, when a called station does not receive the CM signal within a predetermined time t1 after transmission of the ANSam signal, the called station sends the DIS with bit number 6 reset, and executes the protocol according to Recommendations T.30 in response to the DCS signal or NSS sent from the destination communication apparatus. Furthermore, the protocol according to Recommendations V.8 and V.34 are executed in response to the CM signal or a CI signal in placed of the DCS signal or the NSS.

4 Claims, 7 Drawing Sheets

FIG. 4

DIS

| Bit No. | CONTENTS | Bit No. | CONTENTS |
|---|---|---|---|
| 1~5 | Reserved | 28 | Set to "0" |
| 6 | V.8 Capabilities | 29 | Reserved |
| 7 | 0=256, 1=64 octets Preferred | 30 | Reserved |
| 8 | Reserved | 31 | T.6 coding capability |
| 9 | Ready to transmit a facsimile document | 32 | Extend field |
| | | 33~39 | Reserved |
| 10 | Receiver fax operation | 40 | Extend field |
| 11~14 | Data signalling rate | 41 | R8×15.4 lines/mm |
| 15 | R8×7.7 lines/mm and/or 200×200 pels/25.4mm | 42 | 300×300 pels/25.4mm |
| | | 43 | R16×15.4 lines/mm and/or 400×400 pels/25.4mm |
| 16 | Two dimensional coding capability | 44 | Inch based resolution preferred |
| 17,18 | Recoding width capabilities | 45 | Metric based resolution preferred |
| 19,20 | Maximum recoding length capability | 46 | Minimum scan line time capability for higher resolutions |
| 21~23 | Minimum scan line time capability at the receiver | 47 | Selective polling |
| 24 | Extend field | 48 | Extend Field |
| 25 | Reserved | — | — |
| 26 | Uncompressed mode | — | — |
| 27 | Error correction mode | | |

FIG. 5

| Bit No. | CONTENTS | Bit No. | CONTENTS |
|---|---|---|---|
| 49 | Subaddressing capability | 67 | Full and half duplex capability |
| 50 | Password | 68 | JPEG coding |
| 51 | Ready to transmit a data file | 69 | Full colour mode |
| 52 | Reserved | 70 | Set to "0" |
| 53 | Binary file transfer (BFT) | 71 | 12 bits/pel component |
| 54 | Document transfer mode (DTM) | 72 | Extend field |
| 55 | Electronic data interchange (EDI) | 73 | No subsampling (1:1:1) |
| 56 | Extend field | 74 | Custom illuminant |
| 57 | Basic transfer mode (BTM) | 75 | Custom gamut range |
| 58 | Reserved | 76 | North American Letter (215.9× 279.4mm) capability |
| 59 | Ready to Transmit a character or mixed mode document (polling) | 77 | North American Legal (215.9× 355.6mm) capability |
| 60 | Character mode | 78 | Single-progression sequential coding (T.85) basic capability |
| 61 | Reserved | 79 | Single-progression sequential coding (T.85) optional L0 capability |
| 62 | Mixed mode (Annex E/T.4) | 80 | Extend field |
| 63 | Reserved | — | — |
| 64 | Extend field | | |
| 65 | Processable mode 26 (T.505) | | |
| 66 | Digital network capability | | |

DIS

COMMUNICATION APPARATUS

BACKGROUND OF THE INVENTION

1. Field of the Invention

The present invention relates to a communication apparatus like a facsimile machine, which implements communication according to the protocols that are defined by Recommendations T.30, V.8 and V.34 of the ITU-T (International Telecommunication Union for Telecommunications).

2. Description of the Related Art

Recommendation T.30 of the ITU-T defines a protocol for transmitting text via facsimile over a public switched telephone network (PSTN), Recommendation V.8 specifies a session start protocol for data transmission over the PSTN, and Recommendation V.34 defines the specifications of a modem which operates at a data signal rate of up to 33600 bps that is used in the PSTN and a 2-wire, point-to-point telephone-type private line.

FIG. 10 is a diagram showing a sequence of a protocol signal in a communication apparatus according to prior art, which communicates with a destination communication apparatus according to the protocols of Recommendations T.30, V.8 and V.34 of the ITU-T. After a line connection between a calling station and a called station is established, a digital identification signal (DIS) with bit number 6 set, i.e., bit number 6=1, is sent from the called station, and the calling station which receives the DIS without receiving a modulated answer tone signal (ANSam signal) sends a calling indication signal (CI signal). Accordingly, communication protocols according to Recommendations V.8 and V.34 are executed.

The communication protocols according to Recommendations V.8 and V.34 will be discussed. First, the called station sends an ANSam signal. Upon reception of the ANSam signal, the calling station sends a calling menu signal (CM signal). In response to the CM signal received during transmission of the ANSam signal, the called station sends a common menu signal (JM signal). A modulation mode between the calling station and the called station is determined by exchanging the CM signal and the JM signal. Upon reception of the JM signal, the calling station sends a CJ (CM end) signal, and then carries out the communication protocols according to Recommendations V.8 and V.34. Upon reception of the CJ signal, the called station stops sending the JM signal, after which the called station carries out the protocols according to Recommendations V.8 and V.34.

For example, Japanese Unexamined Patent Publication JP-A 8-214136 (1996) discloses a technique of effectively using the functions provided by the V.8 protocol. Specifically, when a calling station cannot receive the JM signal from a called station while transmitting the CM signal, the calling station switches the communication system to a half duplex communication system to receive the JM signal after completing the transmission of the CM signal. When a called station cannot receive the CM signal and CJ signal while transmitting the JM signal, the called station switches the communication system to the half duplex communication system to receive the CJ signal after completing the transmission of the JM signal.

Japanese Unexamined Patent Publication JP-A 8-298579 (1996) discloses such a technique that when communication has started in the full duplex communication, a called station, in order to allow a calling station to communicate, even if the calling station does not have a full duplex communication function, sends a DIS in the case where the called station does not detect a CM signal after sending an ANSam signal, and the calling station sends a DCS signal in response to the DIS.

In the above case where the calling station receives the DIS with bit number 6 set without receiving the ANSam signal and sends the CI signal to execute the communication protocols according to Recommendations V.8 and V.34, a communication error occurs when the calling station does not receive the ANSam signal sent from the called station that has received the CI signal, as shown in FIG. 11. This disables transmission and reception of information which should be communicated. In the case where the calling station receives the ANSam signal from the called station when the calling station has sent the CI signal for a predetermined number of times, as shown in FIG. 12, the time required for exchanging a protocol signal becomes longer, resulting in a higher communication cost.

Further, according to the prior art communication apparatus, when a called station which has sent the ANSam signal does not receive the CM signal from a calling station within a predetermined period after transmission of the ANSam signal, the called station sends the DIS with bit number 6 set, as shown in FIGS. 11 and 12. Upon reception of the DIS, the calling station acknowledges that bit number 6 is set, and sends the CI signal and then the CM signal. In this manner, the communication protocols according to Recommendations V.8 and V.34 are implemented.

When the called station which has sent the DIS can not receive the CI signal and the CM signal, however, the called station should send the DIS repeatedly. This elongates the communication time, resulting in a higher communication cost, or may result in a communication error when the protocol of phase 1 (network interaction) cannot end within a predetermined period. Further, the protocol of phase 2 (probing) or the protocol of phase 3 (training with a primary channel equalizer) may not be able to end properly, requiring that the phase be retried repeatedly. This elongates the communication time, or may result in a communication error when the phase 2 or the phase 3 can not end within a predetermined period.

SUMMARY OF THE INVENTION

It is hence an object of the present invention to provide a communication apparatus allowing transmission and reception of signals according to a predetermined protocol to enable communication with a destination communication apparatus in a short period of time when a calling station receives a DIS without receiving an ANSam signal or when a called station does not receive a CM signal from the destination communication apparatus within a predetermined period after sending the ANSam signal.

In one aspect of the invention, a communication apparatus capable of communicating with a destination communication apparatus according to protocols of Recommendations T.30, V.8 and V.34 of the ITU-T comprises:

transmitting/receiving means for transmitting and receiving a communication signal;

signal detecting means for detecting whether a DIS is received from the destination communication apparatus after a line connection thereto is established with the destination communication apparatus serving as a calling station; and control means for, when reception of the DIS is detected by the signal detecting means, allowing a digital command signal (DCS) or a nonstandard facilities set-up signal (NSS) to be sent regardless of whether bit number 6 indicative of presence or absence of an capability of the Recommendation V.8 is 0 or 1, and then a protocol signal according to Recommendation T.30 to be sent.

According to the invention, when the communication apparatus of the invention which serves as a calling station receives the DIS without receiving the ANSam signal after a line connection has been established to a destination communication apparatus serving as a called station, this communication apparatus does not send the CI signal but sends the DCS signal or NSS irrespective of the value of bit number 6 of the DIS, and then carries out the protocol according to Recommendation T.30. This prevents a communication error from occurring when the called station receives the CI signal and sends the ANSam signal, which is not received by the calling station. It is therefore possible to ensure transmission and reception of information that should be communicated. Further, it is possible to avoid such an event that the calling station sends the CI signal several times and receives the ANSam signal sent in response to each CI signal. This reduces the time needed to exchange the protocol signal, thus suppressing an increase in communication cost. Furthermore, after a line connection is established, the communication apparatus carries out protocols according to Recommendations V.8 and V.34 upon reception of the ANSam signal to exchange the protocol signal in a short period of time, thus ensuring transmission and reception of information that should be communicated.

In another aspect of the invention, a communication apparatus for communicating with a destination communication apparatus according to protocols of Recommendations T.30, V.8 and V.34 of the ITU-T comprises:

transmitting/receiving means for transmitting and receiving a communication signal;

signal detecting means for detecting whether a CM signal is received from the destination communication apparatus after a line connection thereto is established with the communication apparatus serving as a called station within a predetermined period after having sent an ANSam signal designating a full duplex transfer system; and control means for, when the signal detecting means detects that the CM signal is not received within the predetermined period, allowing a DIS with bit number 6 reset to be sent, and allowing a protocol signal according to Recommendation T.30 to be sent in response to a DCS or an NSS sent from the destination communication apparatus.

According to the aspect of the invention, with a line connection established to a destination communication apparatus serving as a calling station, when the communication apparatus which serves as a called station does not receive the CM signal from the destination communication apparatus within a predetermined period after transmission of the ANSam signal, the communication apparatus sends the DIS with bit number 6 reset. The destination communication apparatus, which has detected from the DIS that the communication apparatus as the called station has no Recommendation V.8 capability, sends the DCS signal or NSS. In response to the DCS or NSS, the communication apparatus as the called station performs the protocol according to Recommendation T.30. Accordingly, the called station does not send the DIS repeatedly, thus shortening the communication time to suppress an increase in communication cost. It is also possible to ensure transmission and reception of information that should be communicated, without causing a communication error.

In still another aspect of the invention, the control means may allow the DIS with bit number 6 reset and then allow the protocol signal according to Recommendations V.8 and V.34 to be sent in response to a CM signal different from the DIS sent from the destination communication apparatus.

According to the aspect of the invention, with a line connection established to a destination communication apparatus as a calling station, the communication apparatus as a called station sends the ANSam signal and the destination communication apparatus sends the CM signal upon reception of the ANSam signal, but when the communication apparatus of the called station cannot receive the CM signal, this communication apparatus sends the DIS with bit number 6 reset and implements the protocols according to Recommendations V.8 and V.34 in response to the CM signal sent from the destination communication apparatus. This reduces the communication time to suppress an increase in communication cost, and can ensure transmission and reception of information that should be communicated, without causing a communication error.

In yet another aspect of the invention, the control means may allow the DIS with bit number 6 reset and then allow the protocol signal according to Recommendations V.8 and V.34 to be sent in response to a CI signal different from the DIS sent from the destination communication apparatus.

According to the aspect of the invention, with a line connection established to a destination communication apparatus as a calling station, when the communication apparatus as a called station does not receive the CM signal from the destination communication apparatus within a predetermined period after transmission of the ANSam signal, the communication apparatus sends the DIS with bit number 6 reset and implements the protocols according to Recommendations V.8 and V.34 in response to the CI signal sent from the destination communication apparatus. This reduces the communication time to suppress an increase in communication cost, and can ensure transmission and reception of information that should be communicated, without causing a communication error.

BRIEF DESCRIPTION OF THE DRAWINGS

Other and further objects, features, and advantages of the invention will be more explicit from the following detailed description taken with reference to the drawings wherein:

FIG. 4 is a diagram depicting a DIS;

FIG. 5 is a diagram showing the DIS;

DETAILED DESCRIPTION OF THE PREFERRED EMBODIMENTS

Figure 1:
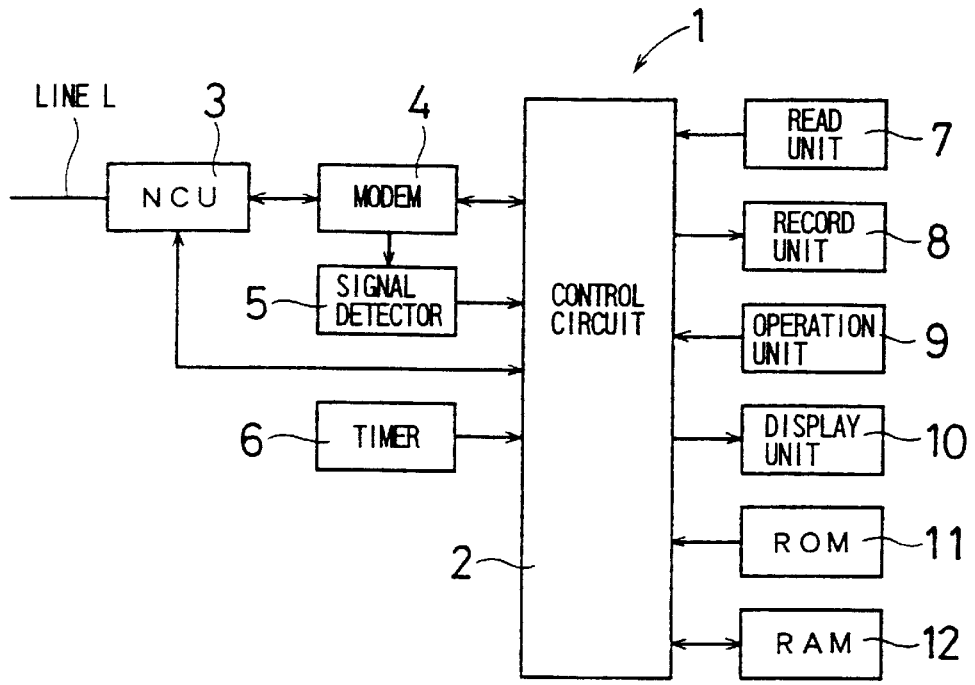
FIG. 1 is a block diagram illustrating the electric structure of a communication apparatus 1 according to one embodiment of the invention.

Now referring to the drawings, preferred embodiments of the invention are described below.

FIG. 1 presents a block diagram showing the electric structure of a communication apparatus 1 according to one embodiment of the invention. This communication apparatus 1 is capable of communicating with a destination communication apparatus according to the protocols of Recommendations t.30, V.8 and V.34 of the ITU-T. A control circuit 2, which may be comprised of a CPU (Central Processing Unit), controls the operations of an NCU (Network Control Unit) 3, a modem 4, a signal detector 5, a timer 6, a read unit 7, a record unit 8, an operation unit 9 and a display unit 10, all connected to the control circuit 2, in accordance with a program which is stored in a ROM (Read Only Memory) 11 to control the operation of the entire apparatus. A RAM (Random Access Memory) 12 temporarily stores various kinds of information for operational control. The NCU 3 controls a connection to a line L, as well as sends a dial pulse corresponding to a destination apparatus and detects an incoming signal. Transmission data, modulated by the modem 4, is supplied to the NCU 3, and data received by the NCU 3 is given to the modem 4 to be demodulated.

The signal detector 5 detects various sorts of protocol signals from received data supplied to the modem 4 and gives the detection result to the control circuit 2. Based on the detection result from the signal detector 5, the control circuit 2 determines whether the communication apparatus 1 serving as a calling station has received a DIS from the destination communication apparatus serving as a called station without receiving an ANSam signal which specifies a full duplex transfer system, after a line connection to the destination communication apparatus has been established. Further, based on the detection result from the signal detector 5, the control circuit 2 determines whether the communication apparatus 1 serving as a called station has received a CM signal from the destination communication apparatus serving as a calling station within a predetermined ANSam-signal transmission time t1 after transmission of the ANSam signal after a line connection to the destination communication apparatus has been established. The timer 6 has a first timer to measure the predetermined time t1, and a second timer to measure a predetermined time t2 after transmission of the DIS.

The communication apparatus 1 according to this embodiment has a facsimile communication function and the read unit 7 reads an image on an original. The record unit 8 prints and records received image data or image data, read by the read unit 7, on a predetermined recording sheet. The operation unit 9 has dial keys for input a telephone number for specifying the destination communication apparatus, and a start key for initiating the operation of the facsimile communication. The display unit 10 displays various kinds of information.

Figure 2:
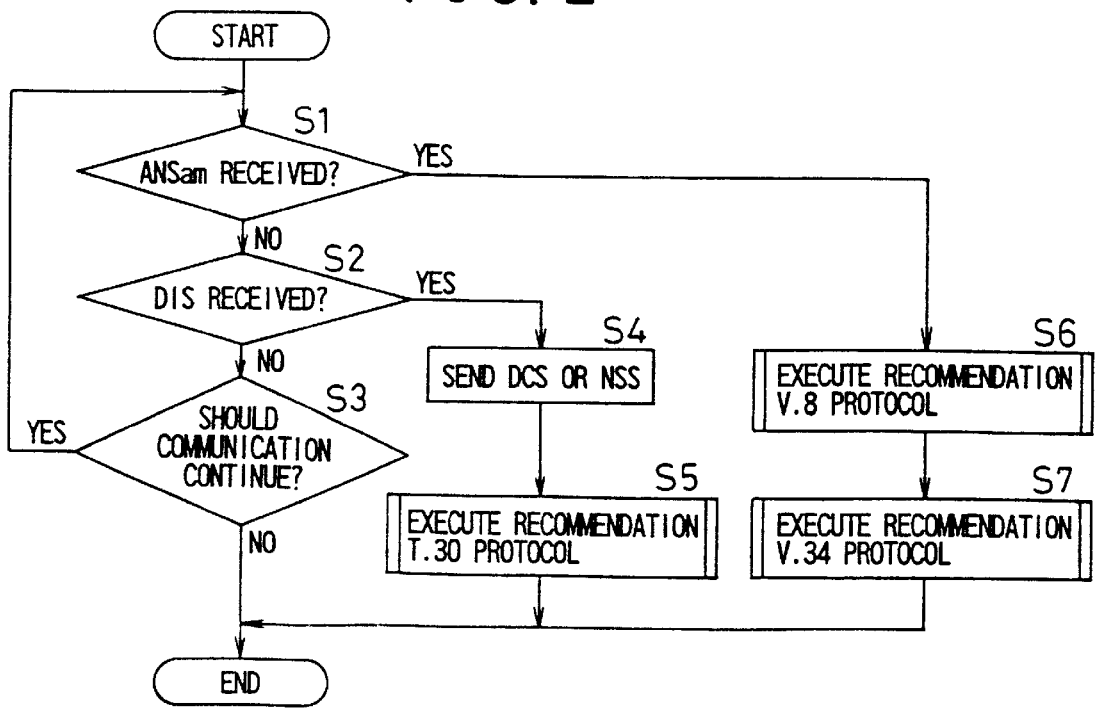
FIG. 2 is a flowchart for explaining a first operation of the communication apparatus 1.
Figure 3:
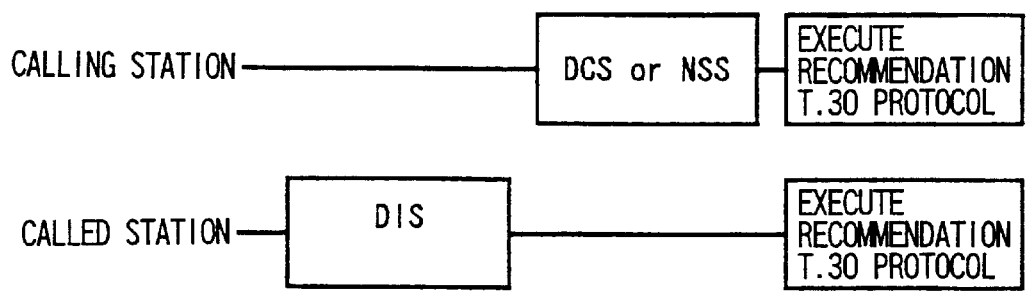
FIG. 3 is a diagram showing a sequence of a protocol signal in the first operation.

FIG. 2 is a flowchart for explaining a first operation of the communication apparatus 1. FIG. 3 shows a sequence of a protocol signal for the first operation. The following description will be given of the case where the communication apparatus 1 is a calling station. In step S1, it is determined whether the ANSam signal from a called station has been received. The flow proceeds to step S2 when the ANSam signal has not been received yet, and proceeds to step S6 when the signal has been received. In step S2, it is determined whether the DIS as shown in FIGS. 4 and 5 has been received. The flow goes to step S4 when the DIS has been received, and goes to step S3 to determined whether or not to continue the communication, when the signal has not been received yet. When the communication should continue, the flow returns to step S1, and when the communication need not continue, the communication operation is terminated. In step S4, a DCS signal or an NSS is sent after which the flow moves to step S5. In step S5, the protocol according to Recommendation T.30 is executed after which the communication operation will be terminated. In step S6, the protocol according to Recommendation V.8 is executed after which the flow proceeds to step S7 to implement the protocol according to Recommendation V.34, followed by the termination of the communication operation.

According to the first operation, as apparent from the above, with a line connection established to a destination communication apparatus, when the communication apparatus 1 on the calling station side receives the DIS without receiving the ANSam signal, this communication apparatus 1 sends the DCS signal or NSS, and then executes the protocol according to Recommendation T.30. It is therefore possible to avoid a communication error which would otherwise occur when the destination communication apparatus on the called station side receives the CI signal and sends the ANSam signal, which is not received by the communication apparatus 1 of the calling station. It is therefore possible to ensure transmission and reception of information that should be communicated. Further, such an event that the calling station sends the CI signal several times and receives the ANSam signal sent in response to each CI signal, can be avoided. This shortens the time required to exchange the protocol signal, thus suppressing an increase in communication cost.

Additionally, after the line connection to the destination communication apparatus is established, the communication apparatus 1, upon reception of the ANSam signal, implements the protocols according to Recommendations V.8 and V.34. That is, the communication apparatus 1 sends the CM signal. In response to the CM signal received during transmission of the ANSam signal, the called station sends a JM signal. A modulation mode between the calling station and the called station is determined by exchanging the CM signal and the JM signal. Upon reception of the JM signal, the calling station sends a CJ signal, and then carries out the communication protocols according to Recommendations V.8 and V.34. Upon reception of the CJ signal, the called station stops sending the JM signal, and then carries out the communication protocols according to Recommendations V.8 and V.34. It is thus possible to exchange the protocol signal in a short period of time to ensure transmission and reception of information that should be communicated.

Figure 6:
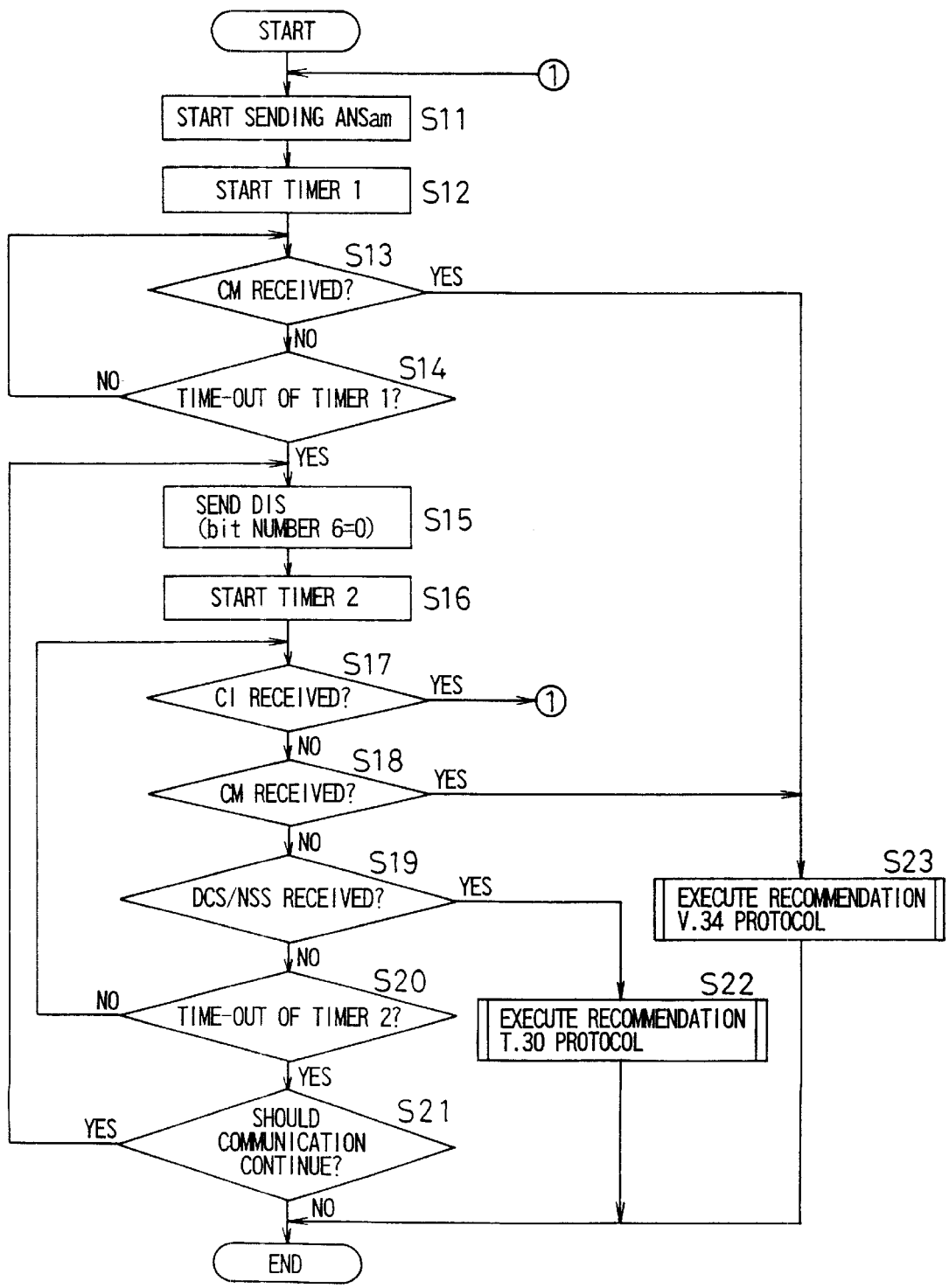
FIG. 6 is a flowchart for explaining a second operation of the communication apparatus 1.
Figure 7:
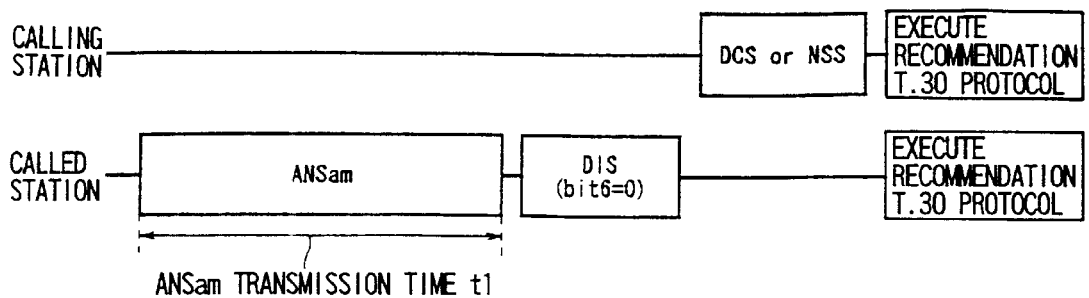
FIG. 7 is a diagram showing a sequence of a protocol signal in the second operation.
Figure 8:
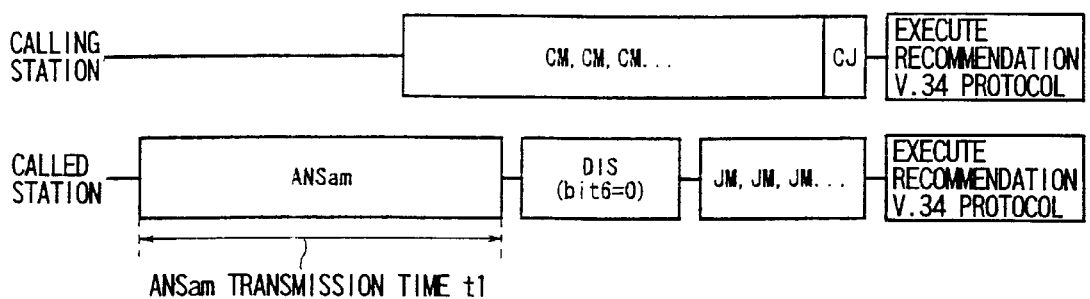
FIG. 8 is a diagram illustrating a sequence of a protocol signal in the second operation.
Figure 9:
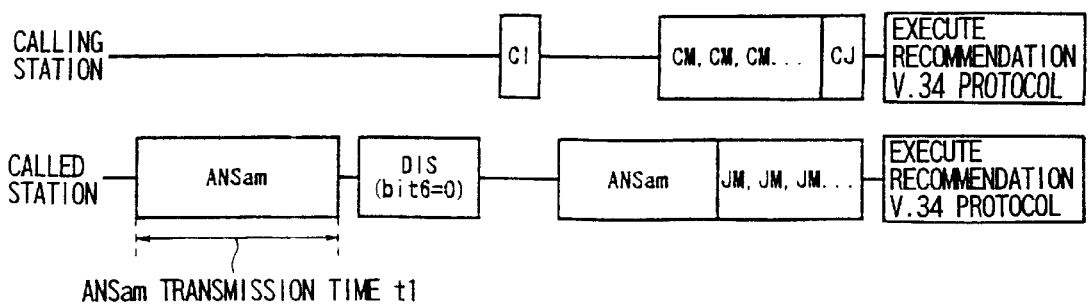
FIG. 9 is a diagram showing a sequence of a protocol signal in the second operation.
Figure 10:
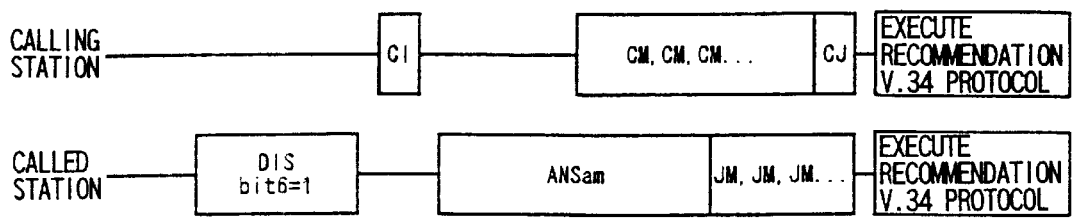
FIG. 10 is a diagram depicting a sequence of a protocol signal in a conventional communication apparatus which communicates with a destination communication apparatus according to the protocols of Recommendations T.30, V.8 and V.34 of the ITU-T.
Figure 11:
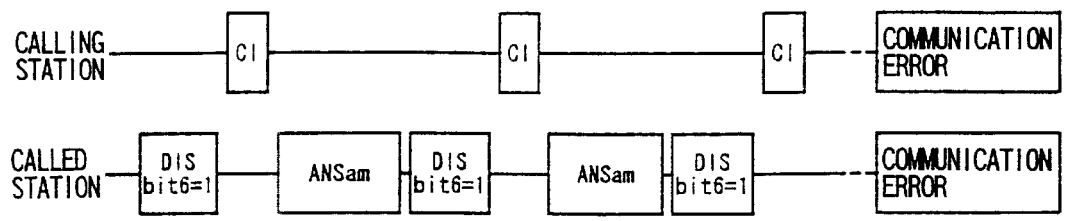
FIG. 11 is a diagram depicting a sequence of a protocol signal for explaining a shortcoming in the conventional communication apparatus.
Figure 12:
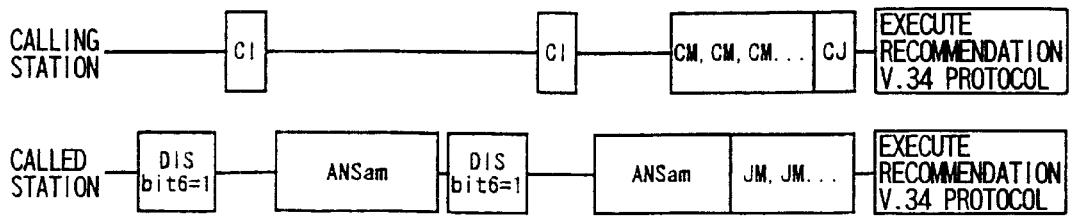
FIG. 12 is a diagram showing a sequence of a protocol signal for explaining another shortcoming in the conventional communication apparatus.

FIG. 6 is a flowchart for explaining a second operation of the communication apparatus 1. FIGS. 7 to 9 show sequences of protocol signals for the second operation. In the following description, the communication apparatus 1 will be explained as a called station. In step S11, after a line connection to the destination communication apparatus has been established, transmission of the ANSam signal starts. In step S12, measuring the predetermined transmission time t1 for the ANSam signal starts using the first timer of the timer 6. The transmission time t1 is a predetermined time after transmission of the ANSam signal, which is specified by Recommendation V.8.

In step S13, it is determined whether the CM signal from the calling station has been received. When the CM signal has been received, the flow proceeds to step S23 to execute the protocols according to Recommendations V.8 and V.34, after which the communication operation will be terminated. When the CM signal has not been received yet, on the other hand, the flow proceeds to step S14 and when the first timer times out thee, the flow goes to step S15. The processes in steps S13 and S14 are repeated until time-out occurs. In step S15, the DIS with bit number 6 reset, i.e., bit number 6=0, is sent. In step S16, measuring the predetermined time t2 starts using the second timer of the timer 6. The time t2 is a predetermined time after transmission of the DIS, which is specified by Recommendation T.30.

In step S17, it is determined whether the CI signal from the calling station has been received. The flow returns to step S11 when the CI signal has been received, and proceeds to step S18 when the CI signal has not been received yet. In step S18, it is determined whether the CM signal from the calling station has been received. When the CM signal has been received, the flow proceeds to step S23 to execute the protocols according to Recommendations V.8 and V.34 after which the communication operation will be terminated. When the CM signal has not been received yet, on the other hand, the flow proceeds to step S19. In step S19, it is determined whether the DCS signal or NSS from the calling station has been received. When the DCS signal or NSS has been received, the flow moves to step S22 to execute the protocol according to Recommendation T.30 after which the communication operation will be terminated. When the DCS signal or NSS has not been received yet, on the other hand, the flow proceeds to step S20. When the second timer times out in step S20, the flow proceeds to step S21. The processes in steps S17 to S20 are repeated until time-out occurs.

In step S21, it is determined whether or not to continue the communication. The flow returns to step S15 when the communication should continue, whereas the communication operation will be terminated when the communication need not continue.

According to the second operation, therefore, as shown in FIG. 7, with a line connection established to a destination communication apparatus, when the communication apparatus 1 which serves as a called station does not receive the CM signal from the destination communication apparatus within the predetermined ANSam-signal transmission time t1 after transmission of the ANSam signal, the communication apparatus 1 sends the DIS with bit number 6 reset, and the communication apparatus 1 implements the protocol according to Recommendation T.30 in response to the DCS signal or NSS sent from the destination communication apparatus, which has detected that the communication apparatus 1 has no Recommendation V.8 capability.

Further, as shown in FIG. 8, with a line connection established to a destination communication apparatus, when the destination communication apparatus sends the CM signal upon reception of the ANSam signal, but the communication apparatus 1 cannot receive the CM signal, the communication apparatus 1 sends the DIS with bit number 6 reset and executes the protocols according to Recommendations V.8 and V.34 in response to the CM signal sent from the destination communication apparatus. In other words, the calling station, which has received the JM signal sent from the called station, sends the CJ signal and executes the protocols according to Recommendations V.8 and V.34. The called station which has received the CJ signal stops sending the JM signal and executes the protocols according to Recommendations V.8 and V.34.

Further, as shown in FIG. 9, with a line connection established to a destination communication apparatus, when the communication apparatus 1 has not received the CM signal from the destination communication apparatus within the predetermined ANSam-signal transmission time t1 after transmission of the ANSam signal, the communication apparatus 1 sends the DIS with bit number 6 reset and executes the protocols according to Recommendations V.8 and V.34 in response to the CI signal sent from the destination communication apparatus. That is, the called station sends the ANSam signal and sends the JM signal in response to the CM signal which has been received during the transmission of the ANSam signal. The calling station, which has received the JM signal, sends the CJ signal and executes the protocols according to Recommendations V.8 and V.34. The called station which has received the CJ signal stops sending the JM signal and executes the protocols according to Recommendations V.8 and V.34.

Therefore, the communication apparatus 1 on the called station side does not send the DIS repeatedly, which shortens the communication time, thus suppressing an increase in communication cost. Further, a communication error can be avoided, thus ensuring transmission and reception of information that should be communicated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication apparatus capable of communicating with a destination communication apparatus according to protocols of Recommendations T.30, V.8 and V.34 of the ITU-T comprising:

transmitting/receiving means for transmitting and receiving a communication signal;

signal detecting means for detecting whether a digital identification signal (DIS) is received from the destination communication apparatus after a line connection thereto is established with the destination communication apparatus serving as a calling station; and control means for, when reception of the DIS is detected by the signal detecting means, allowing a digital command signal (DCS) or a nonstandard facilities set-up signal (NSS) to be sent regardless of whether bit number 6 indicative of presence or absence of an capability of the Recommendation V.8 is 0 or 1, and then a protocol signal according to Recommendation T.30 to be sent.

2. A communication apparatus capable of communicating with a destination communication apparatus according to protocols of Recommendations T.30, V.8 and V.34 of the ITU-T comprising:

transmitting/receiving means for transmitting and receiving a communication signal;

signal detecting means for detecting whether a calling menu signal (CM signal) is received from the destination communication apparatus after a line connection thereto is established with the communication apparatus serving as a called station within a predetermined period after having sent a modulated answer tone signal (ANSam signal) designating a full duplex transfer system; and control means for, when the signal detecting means detects that the CM signal is not received within the predetermined period, allowing a digital identification signal (DIS) with bit number 6 reset to be sent, and allowing a protocol signal according to Recommendation T.30 to be sent in response to a digital command signal (DCS) or a nonstandard facilities set-up signal (NSS) sent from the destination communication apparatus.

3. The communication apparatus of claim 2, wherein the control means allows the DIS with bit number 6 reset and then allow the protocol signal according to Recommendations V.8 and V.34 to be sent in response to a calling menu signal (CM signal) different from the DIS sent from the destination communication apparatus.

4. The communication apparatus of claim 2, wherein the control means allows the DIS with bit number 6 reset and then allow the protocol signal according to Recommendations V.8 and V.34 to be sent in response to a calling indication signal (CI signal) different from the DIS sent from the destination communication apparatus.

* * * * *